US007701982B2

(12) United States Patent
Yu et al.

(10) Patent No.: US 7,701,982 B2
(45) Date of Patent: Apr. 20, 2010

(54) APPARATUSES AND METHODS FOR STABILIZING CARRIER-ENVELOPE PHASE OF LASER PULSE BY USING DIRECT LOCKING METHOD

(75) Inventors: Tae-Jun Yu, Gwangju (KR); Jong-Min Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 67 days.

(21) Appl. No.: 12/003,294

(22) Filed: Dec. 21, 2007

(65) Prior Publication Data

US 2009/0135859 A1  May 28, 2009

(30) Foreign Application Priority Data

Nov. 23, 2007   (KR) ...................... 10-2007-0120547

(51) Int. Cl.
H01S 3/098 (2006.01)
H01S 3/10 (2006.01)
H01S 3/13 (2006.01)
(52) U.S. Cl. .................... 372/18; 372/25; 372/29.02; 372/30
(58) Field of Classification Search ................ 372/18, 372/22, 25, 29.016, 29.02, 29.023, 30, 32
See application file for complete search history.

(56) References Cited

U.S. PATENT DOCUMENTS

| 6,724,788 B1 | 4/2004 | Holzwarth et al. |
| 2004/0017833 A1 | 1/2004 | Cundiff et al. |

OTHER PUBLICATIONS

Tae Jun Yu et al., "Precise and long-term stabilization of the carrier-envelope phase of femtosecond laser pulses using an enhanced direct locking technique" Apr. 2007, vol. 15, No. 13, Optics Express 8203.*
Communication dated Jun. 16, 2009, from the German Patent and Trade Mark Office (DPMA) in German Utility Model Application No. 20 2007 017 492.6, corresponding to the above identified application.
Imran, Tayyab et al., "Stabilization and Control of the Carrier-Envelope Phase of High-Power Femtosecond Laser Pulses Using the Direct Locking Technique", pp. 104-112.
Lee, Yong Soo et al., "Novel Method for Carrier-Envelope-Phase Stabilization of Femtosecond Laser Pulses", pp. 2969-2976.

* cited by examiner

*Primary Examiner*—Armando Rodriguez
(74) *Attorney, Agent, or Firm*—Harness, Dickey & Pierce, P.L.C.

(57) ABSTRACT

Apparatus for stabilizing carrier-envelope phase (CEP) of laser pulse generated by mode locked pulsed laser based on direct locking method includes laser oscillator, interferometer, detector and double feedback circuit. The laser oscillator includes the mode locked pulsed laser generating the laser pulse. The interferometer generates laser pulses having first and second frequency components from the laser pulse generated by the mode locked pulsed laser to generate first and second interference signals that substantially correspond to each other in time domain and space domain. The detector receives the first and second interference signals to output third and fourth interference signals by inverting phase of the second interference signal. The double feedback circuit controls the laser oscillator so that the CEP of the laser pulse generated by the mode locked pulsed laser has substantially constant value with respect to time using CEP signal obtained from the third and fourth interference signals.

18 Claims, 15 Drawing Sheets

APPARATUSES AND METHODS FOR STABILIZING CARRIER-ENVELOPE PHASE OF LASER PULSE BY USING DIRECT LOCKING METHOD

CLAIM FOR PRIORITY

This application claims priority from Korean Patent Application No. 10-2007-0120547, filed on Nov. 23, 2007, in the Korean Intellectual Property Office (KIPO), the entire contents of which are incorporated herein by reference.

BACKGROUND

1. Field of the Invention

The present invention relates to apparatuses and methods for stabilizing a carrier-envelope phase of a laser pulse. More particularly, the present invention relates to apparatuses and methods for stabilizing the carrier-envelope phase of a laser pulse by using a direct locking method.

2. Description of the Related Art

Since late 1990s, the carrier-envelope phase (CEP) stabilization of femtosecond laser pulses has been intensively studied as a key technique for high-precision frequency metrology and attosecond science. The CEP stabilization technique in mode-locked femtosecond lasers was first proposed by ultrafast laser scientists and experimentally realized by frequency metrology researchers.

Recently, the CEP stabilization technique was successfully extended to chirped-pulse amplification (CPA) laser systems for the generation of high energy and high-intensity CEP-stabilized pulses. The CEP-stabilized laser has become a revolutionary light source for the frequency metrology, whereas the CEP-stabilized CPA lasers have become an essential tool for the generation of reproducible attosecond XUV pulses that can probe ultrafast electron dynamics in atoms and molecules.

For reliable applications of the CEP stabilization technique, low phase noise and excellent long-term stability are crucial, so great efforts have been made for the enhancement of these parameters in the CEP stabilized femtosecond lasers.

As the technique for reducing pulse width of a laser pulse rapidly develops, a mode-locked pulsed laser has been developed. According to the mode-locked pulsed laser, a laser pulse width corresponds to only two laser oscillation wavelengths to reduce pulse width. Regarding the mode-locked pulsed laser, the technique for reproducing a pulse shape attracts many people's interest.

FIG. 1 shows a pulse train generated by a mode-locked pulsed laser. Referring to FIG. 1, the mode-locked pulsed laser oscillates as a pulse train shape according to a time. A time interval τ means a round trip time required for coming and going in a laser cavity. In other words, the time interval τ is represented as 2 L/c, wherein L is a length of the cavity and c is a speed of light. The time interval τ equals to the reciprocal of a repetition rate $f_{rep}$.

The phase difference between a peak of the carrier wave of a laser pulse and a peak of envelope is referred to as the CEP. That is, the CEP is the phase difference between a peak of the carrier wave of a laser pulse and a peak of an envelope.

According to the mode-locked pulsed laser's pulse shape, the envelopes of the laser pulses in the laser cavity do not vary as shown in FIG. 1. However, a group velocity and a phase velocity of the pulses vary due to dispersion in the laser cavity, so that peaks of the envelope of the laser pulses and peaks of the carrier waves of the laser pulses vary at every times, so that absolute phases of the laser pulses vary as $\phi_1$, $\phi_2$, $\phi_3$ and $\phi_4$ in accordance with time.

In FIG. 1, the respective CEP of the laser pulse is $\phi_1$, $\phi_2$, $\phi_3$ and $\phi_4$, respectively and a phase difference between the laser pulses is carrier-envelope phase offset (CEO), which is $\Delta\phi_{cep}$. When the CEO is zero, all of the CEP generated by mode-locked pulsed laser has a same value. When the CEO is π/4, every eighth CEP has a same value.

FIG. 2 shows laser pulses having changing CEP in a time domain when the CEO has a constant value, and FIG. 3 shows laser pulses having changing CEP in a frequency domain when the CEO has a constant value.

Referring to FIG. 2, light frequency of laser pulses in the frequency domain of FIG. 3 are shifted from the position (represented by dotted lines) corresponding to multiples of repetition rate $f_{req}$ by the amount of the carrier-envelope offset frequency δ (or $f_{ceo}$) due to the constant CEO $\Delta\phi_{cep}$.

In the conventional mode-locked pulsed laser, the CEO is not constant. In other words, the CEO is variable while the laser pulses are generated. Therefore, the laser frequency of the conventional mode-locked pulsed laser varies and is unstable.

According to a method disclosed in U.S. Pat. No. 6,724,788 (METHOD AND DEVICE FOR GENERATING RADIATION WITH STABILIZED FREQUENCY) of Dr. Hänsch, who is a Nobel Prize winner of 2005, and U.S. Patent Publication No. 2004/0017833 (MODE-LOCKED PULSED LASER SYSTEM AND METHOD) of Dr. John L. Hall who is also a Nobel Prize winner of 2005, the laser frequency is stably controlled by controlling the CEO. Thanks to the evolutionary laser frequency stabilizing technique disclosed in the above U.S. Pat. No. 6,724,788 and U.S. Patent Publication No. 2004/0017833, a precision of measuring time, space and mass has been thousands of times enhanced, and a measuring method has been simplified.

For example, thanks to the CEP stabilization technique, a clock having precision of down to eighteen decimal places and having only one second error throughout the age of the universe of about fourteen billion years can be obtained.

Recently, the CEP stabilization technique has been applied to fields other than physics so as to generate an atto-second ($10^{-18}$ second) pulse. When an ultra-short pulse is applied to gas so as to generate plasma, a shape of laser oscillation is changed at every time, so that an amount of generated plasma is changed due to the effect of CEP. Therefore, a special light such as the atto-second pulse may be generated in the plasma by controlling the CEP. That is similar to generating ultrahigh speed flash lamp capable of taking a picture in an ultrashort time. Through this technique, a motion picture of electron in an atom may be taken. According to a method disclosed in 2003 through the Journal of 'Nature', the laser controlled by CEP is applied to gas, plasma is generated and then attosecond pulse is obtained, and a moving picture of electron in an atom was taken by using the atto-second pulse. After that, many researches have been performed throughout the world.

The CEP stabilization techniques disclosed in the above U.S. Pat. No. 6,724,788 and U.S. Patent Publication No. 2004/0017833 are based on the phase-locked loop (PLL) that stabilizes a CEP offset frequency so as to follow ward a reference RF signal.

The CEP stabilization techniques disclosed in the above U.S. Pat. No. 6,724,788 and U.S. Patent Publication No. 2004/0017833 stabilizes only the CEO $\Delta\phi_{cep}$ to have a constant value in order to stabilize a laser frequency but does not allow the CEP to have a constant value.

Therefore, as shown in FIGS. 2 and 3, the laser frequency is shifted in the frequency domain by an amount of the CEP offset frequency δ due to the CEO $\Delta\phi_{cep}$.

That is, according to the CEP stabilization techniques disclosed in the above U.S. Pat. No. 6,724,788 and U.S. Patent Publication No. 2004/0017833, the CEP of the laser pulses are changed at every times, so that the laser pulse shapes in time domain are different from each other. As a result, only pulses having the same CEP should be selected in the various laser pulses, when a laser plasma experiment is performed.

Recently, in the thesis "Novel method for carrier-envelope phase stabilization of femtosecond laser pulses" disclosed on Apr. 18, 2005 through the journal of 'OPTICS Express', a CEP stabilization technique based on a direct locking (DL) method is proposed to replace the CEP stabilization technique based on the conventional PLL method.

The DL method has special features in comparison with the conventional PLL method. First, the reference RF signal is not required since the feedback signal is generated in the time domain from f-to-2f beat signal by using a simple DC reference. Therefore, an electronic circuit for embodying the DL method becomes relatively simple. Second, the CEP changes is locked to be zero. Third, the CEP value may be intuitionally and simply modulated in electronic ways by using a shaped external signal.

However, in spite of the advantages described above, the CEP distortion induced by a detection balancing process for removing a background DC noises may be generated when the DL is set up. Additionally, a slow drift of a feedback signal may have influence on an output of a laser pulse to generate crosstalk between the output of the laser pulse and the CEP offset frequency δ or the CEP. Therefore, a circulation ring of a feedback may be broken to disturb the CEP stabilization in the long term.

SUMMARY

Accordingly, the present invention is provided to substantially obviate one or more problems due to limitations and disadvantages of the related art.

Example embodiments of the present invention provide an apparatus for stabilizing a carrier-envelope phase of a laser pulse, which employs an improved DL method, in the long term.

Example embodiments of the present invention also provide a method for stabilizing a carrier-envelope phase of a laser pulse, which employs an improved DL method, in the long term.

In some example embodiments, an apparatus for stabilizing a carrier-envelope phase (CEP) of a laser pulse generated by a mode locked pulsed laser based on a direct locking method includes: a laser oscillator including the mode locked pulsed laser generating the laser pulse; an interferometer generating laser pulses having first and second frequency components from the laser pulse generated by the mode locked pulsed laser to generate first and second interference signals that substantially correspond to each other in a time domain and a space domain; a detector receiving the first and second interference signals to output third and fourth interference signals by inverting a phase of the second interference signal; and a double feedback circuit controlling the laser oscillator so that the carrier-envelope phase (CEP) of the laser pulse generated by the mode locked pulsed laser has substantially a constant value with respect to time using a carrier-envelope phase (CEP) signal obtained from the third and fourth interference signals. The interferometer may include: a time delayer delaying the first frequency component by a given time in order to overlap the first frequency component with the second frequency in the time domain; and a frequency doubler that doubles a frequency of the second frequency component. The interferometer may further include: a first polarization controller dividing the first frequency component into an S-polarization portion and a P-polarization portion, the S-polarization portion and the P-polarization portion of the first frequency component respectively having the same amount; a second polarization controller dividing the second frequency component into an S-polarization portion and a P-polarization portion, the S-polarization portion and the P-polarization portion of the second frequency component respectively having the same amount; and a beam combiner overlapping the first and second frequency components respectively divided by the first and second polarization controllers in the space domain to generate the first and second interference signals. The detector may include: a first detector performing a photo-electric conversion on the first interference signal; a polarization phase shifter inverting a phase of the second interference signal; and a second detector performing the photo-electric conversion on the output of the polarization phase shifter. The first and second detectors respectively may include third and fourth polarization controllers adjusting polarization axes of the first and second interference signals to be substantially parallel with each other. The double feedback circuit may include: a first feedback circuit canceling noise factors of the third and fourth interference signals, and generating a high speed feedback signal for controlling an output of a laser pulse outputted from the mode locked pulsed laser; and a second feedback circuit receiving the high speed feedback signal to generate a low speed feedback signal for controlling an insertion depth of a prism of the laser oscillator. The output of the laser pulse generated by the mode locked pulsed laser may be controlled based on the high speed feedback signal by using an acousto-optics modulator, and the insertion depth of the prism of the laser oscillator may be controlled based on the low speed feedback signal by using a piezo-translator controller. A carrier-envelope phase (CEP) offset frequency of the laser pulse generated by the laser oscillator may be changed by changing an output of the laser pulse generated by the mode locked pulsed laser, based on the high speed feedback signal, and the carrier-envelope phase (CEP) offset frequency of the laser pulse generated by the laser oscillator may be changed by increasing the insertion depth of the prism, based on the low speed feedback signal. The first feedback circuit may include a differential amplifier canceling noise factors of the third and fourth interference signals. The carrier-envelope phase (CEP) signal obtained from the third and fourth interference signals may correspond to an output of the differential amplifier.

In other example embodiments, a method for stabilizing a carrier-envelope phase (CEP) of a laser pulse generated by a mode locked pulsed laser based on a direct locking method includes: generating a laser pulse including first frequency and second frequency components from the laser pulse generated by the mode locked pulsed layer of a laser oscillator to generate first and second interference signals overlapping with each other in a time domain and in a space domain; receiving the first and second interference signals to inverse a phase of the second interference signal in order to generate third and fourth interference signals; generating a high speed feedback signal and a low speed feedback signal for controlling the laser oscillator so that the carrier-envelope phase (CEP) of the laser pulse generated by the mode locked pulsed laser has substantially a constant value with respect to time using a carrier-envelope phase (CEP) signal obtained from the third and fourth interference signals; and stabilizing the carrier-envelope phase (CEP) of the laser pulse generated by the mode locked pulsed laser, based on the high speed feedback signal and the low speed feedback signal. The generating a laser pulse including first frequency and second frequency components from the laser pulse generated by the mode locked pulsed layer of a laser oscillator to generate first and second interference signals overlapping with each other in a time domain and in a space domain may include delaying the first frequency component to generate a delayed first frequency component by a given time. The generating a laser pulse including first frequency and second frequency components from the laser pulse generated by the mode locked pulsed layer of a laser oscillator to generate first and second interference signals overlapping with each other in a time domain and in a space domain may include: dividing the delayed first frequency component into an S-polarization portion and a P-polarization portion, the S-polarization portion and the P-polarization portion of the delayed first frequency component respectively having the same amount; dividing the second frequency component into an S-polarization portion and a P-polarization portion, the S-polarization portion and the P-polarization portion of the second frequency component respectively having the same amount; and overlapping the divided first and second frequency components in the space domain to generate the first and second interference signals. The method may further include adjusting polarization axes of the first and second interference signals to be substantially parallel with each other. The generating a high speed feedback signal and a low speed feedback signal may include: generating the high speed feedback signal for canceling noise factors of the third and fourth interference signals and for controlling an output of the laser pulse generated by the mode locked pulsed laser; and generating the low speed feedback signal for controlling an insertion depth of a prism of the laser oscillator, the prism controlling a degree of propagated distance of a laser pulse propagated in a cavity of the laser oscillator. The stabilizing the carrier-envelope phase (CEP) of the laser pulse generated by the mode locked pulsed laser, based on the high speed feedback signal and the low speed feedback signal may include: controlling an output of the laser pulse generated by the mode locked pulsed laser, based on the high speed feedback signal; and controlling a degree of a propagated distance of a laser pulse propagating in a cavity of the laser oscillator by controlling an insertion depth of the prism, based on the low speed feedback signal. A carrier-envelope phase (CEP) offset frequency of the laser pulse generated by the mode locked pulsed laser may be controlled by varying an output of the laser pulse generated by the mode locked pulsed laser, based on the high speed feedback signal, and the carrier-envelope phase (CEP) offset frequency of the laser pulse generated by the mode locked pulsed laser may be controlled by increasing the insertion depth of the prism, based on the low speed feedback signal. The stabilizing the carrier-envelope phase (CEP) of the laser pulse generated by the mode locked pulsed laser, based on the high speed feedback signal and the low speed feedback signal may include controlling the carrier-envelope phase (CEP) of the laser pulse generated by the mode locked pulsed laser to have substantially a constant value with respect to time based on the high speed feedback signal and the low speed feedback signal.

As described above, according to the apparatus and the method for stabilizing a carrier-envelope phase of a laser pulse, which employ an improved direct locking method, an external noise factor included in the laser pulse generated by the mode locked pulsed laser may be offset, a pure CEP signal may be obtained, and the CEP offset frequency may be controlled to be zero through the feedback of the CEP signal so that the CEP of the laser pulse generated by the mode locked pulsed laser may be a constant value.

Therefore, CEP noise of the laser pulse generated by the mode locked pulsed laser may be reduced to enhance stability of the CEP of the laser pulse generated by the mode locked pulsed laser.

The apparatus for stabilizing a carrier-envelope phase of a laser pulse, which employ an improved direct locking method, may be used as a light source for providing a stable seed beam of a large output laser of several cycles, of which CEP is stabilized.

BRIEF DESCRIPTION OF THE DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
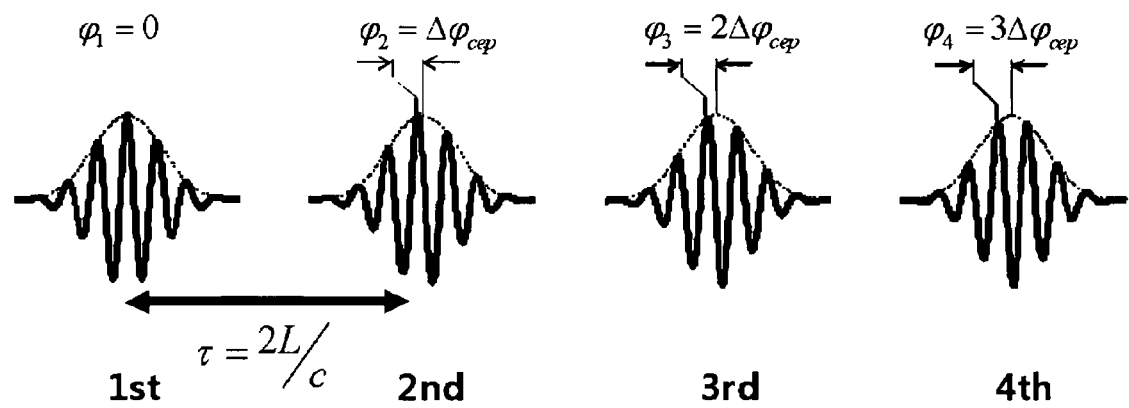
FIG. 1 shows a pulse train generated by a mode-locked pulsed laser.
Figure 2:
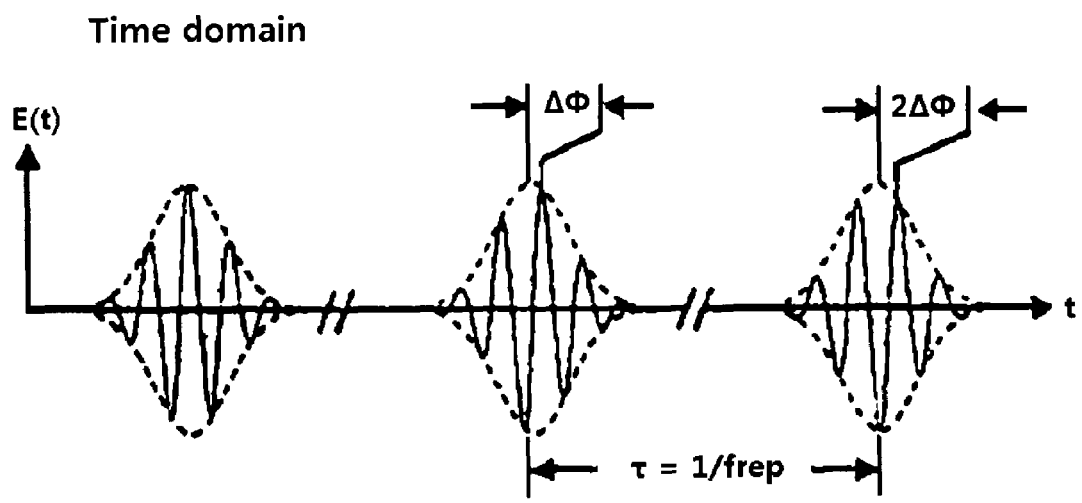
FIG. 2 shows laser pulses having changing CEP in a time domain when the CEO has a constant value.
Figure 3:
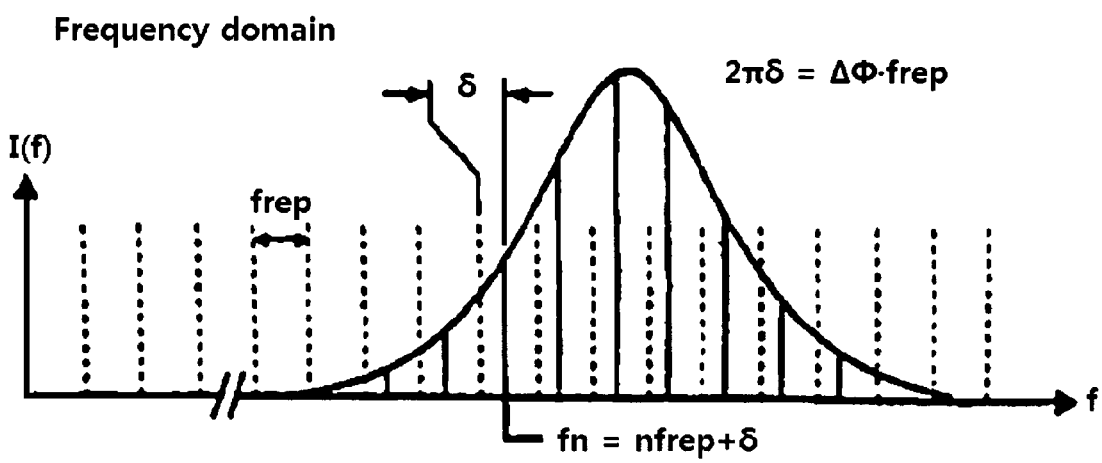
FIG. 3 shows laser pulses having changing CEP in a frequency domain when the CEO has a constant value.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 4:
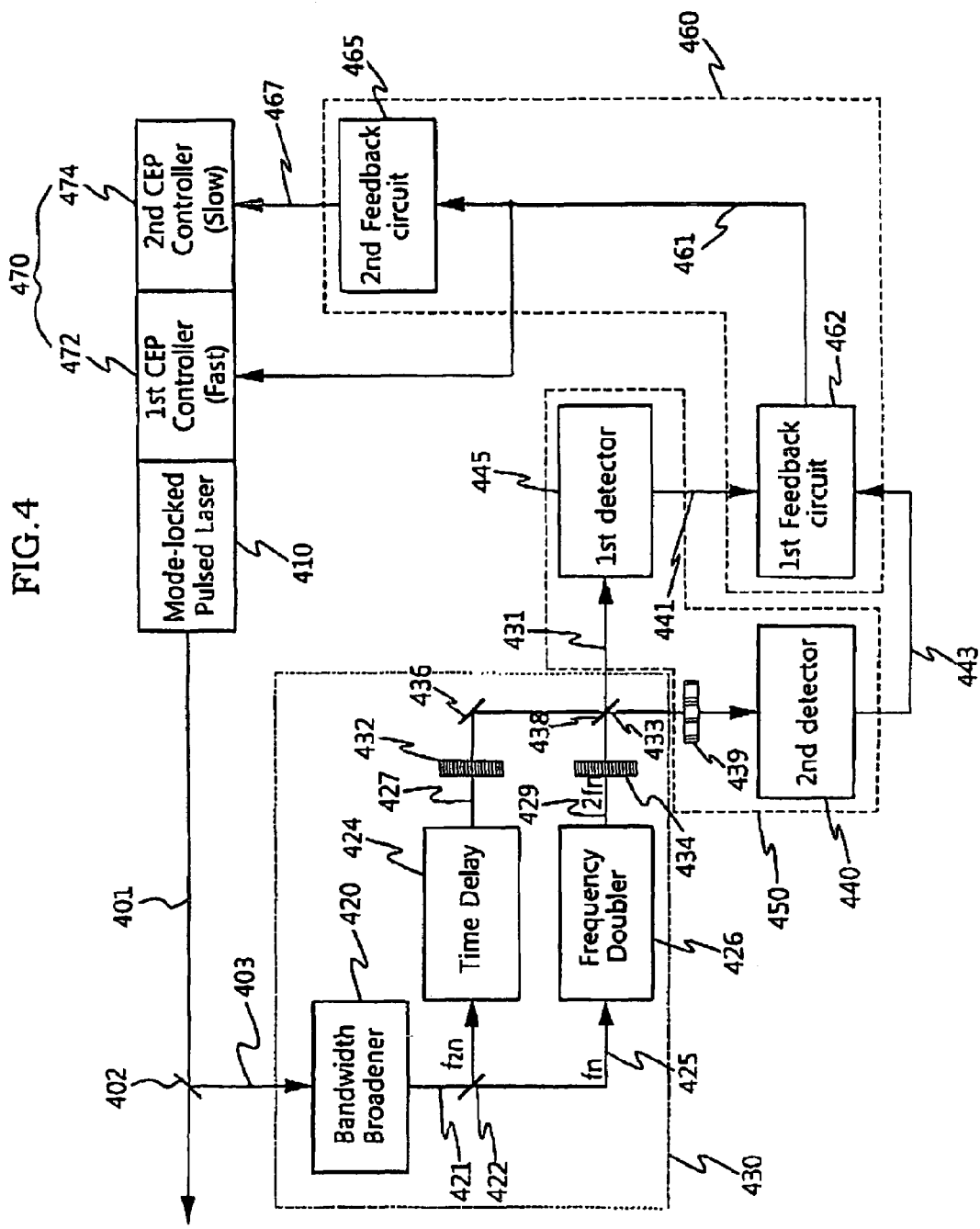
FIG. 4 is a block diagram showing an apparatus for stabilizing the CEP of a laser pulse, which employs an improved DL method, according to an example embodiment of the present invention.
Figure 5:
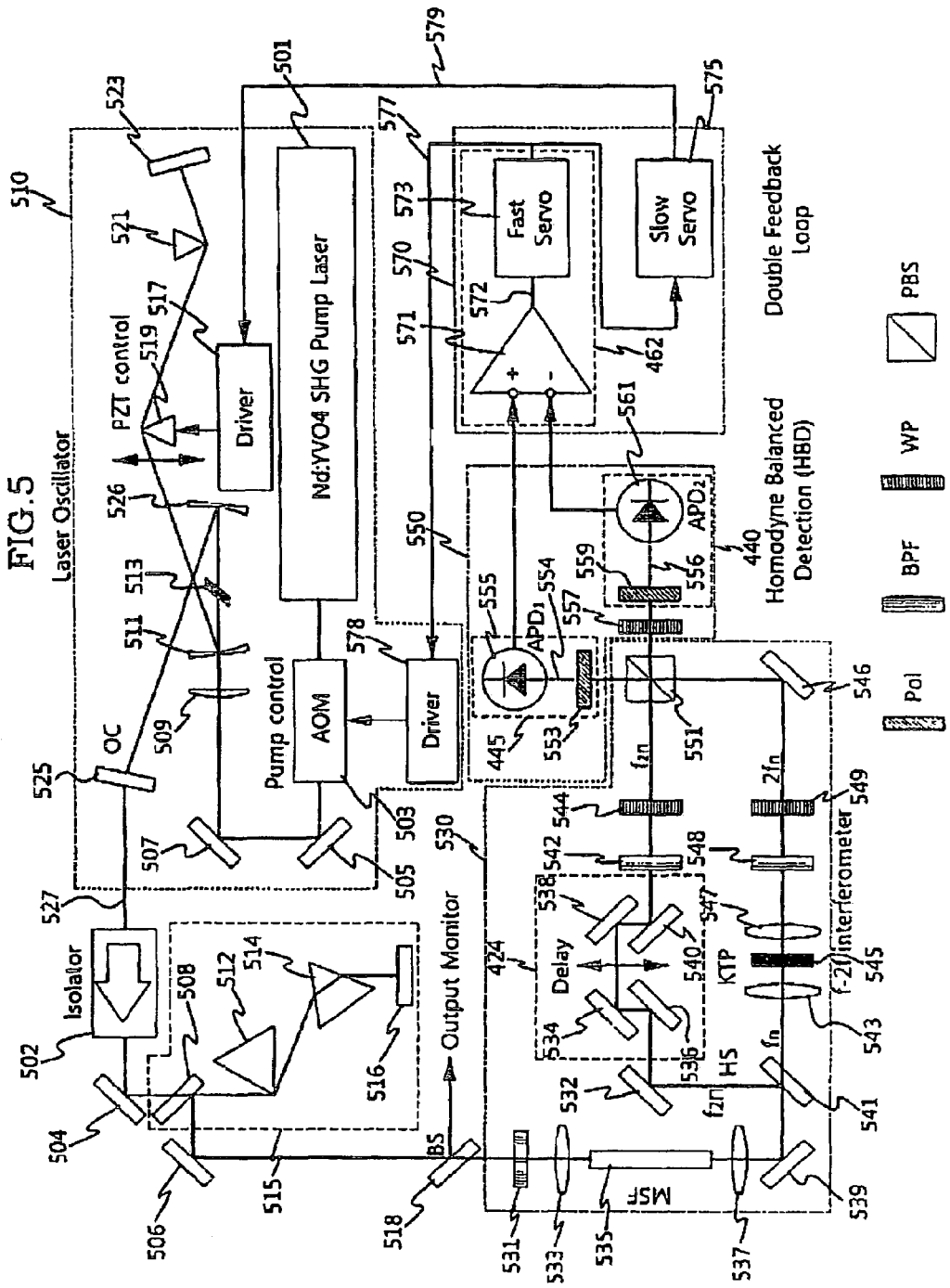
FIG. 5 is a circuit diagram showing an apparatus for stabilizing the CEP of a laser pulse, which employs an improved DL method, according to an example embodiment of the present invention.
Figure 6:
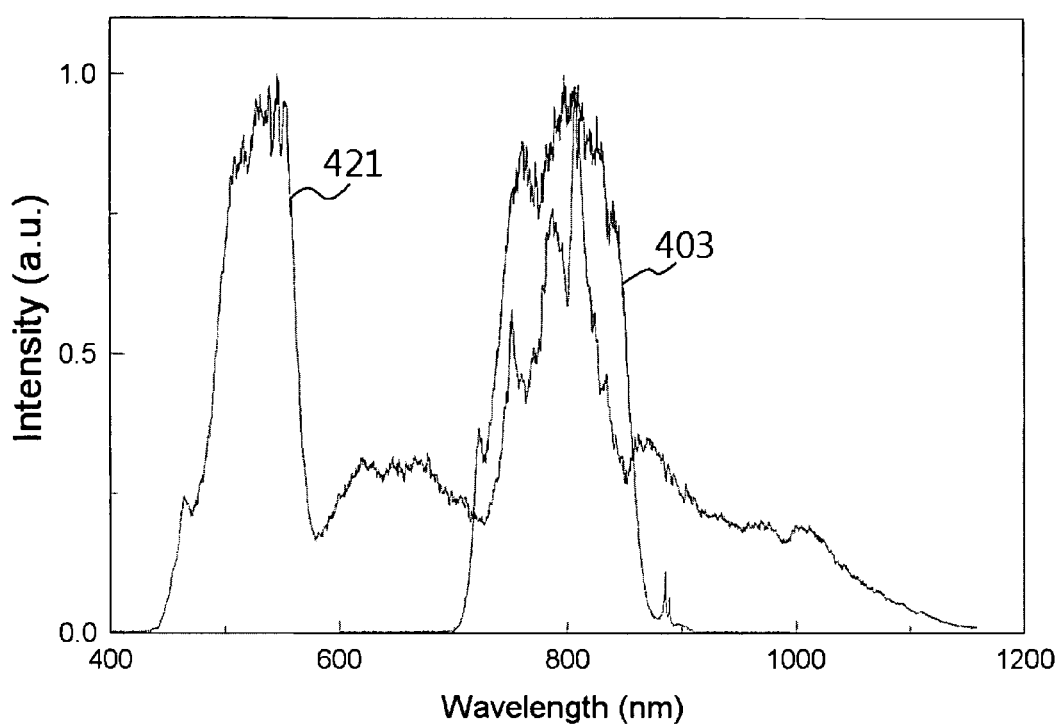
FIG. 6 is a graph showing an octave spanning spectrum including $f_n$ frequency component and $f_{2n}$ frequency component which are outputs of a bandwidth broadener.
Figure 7:
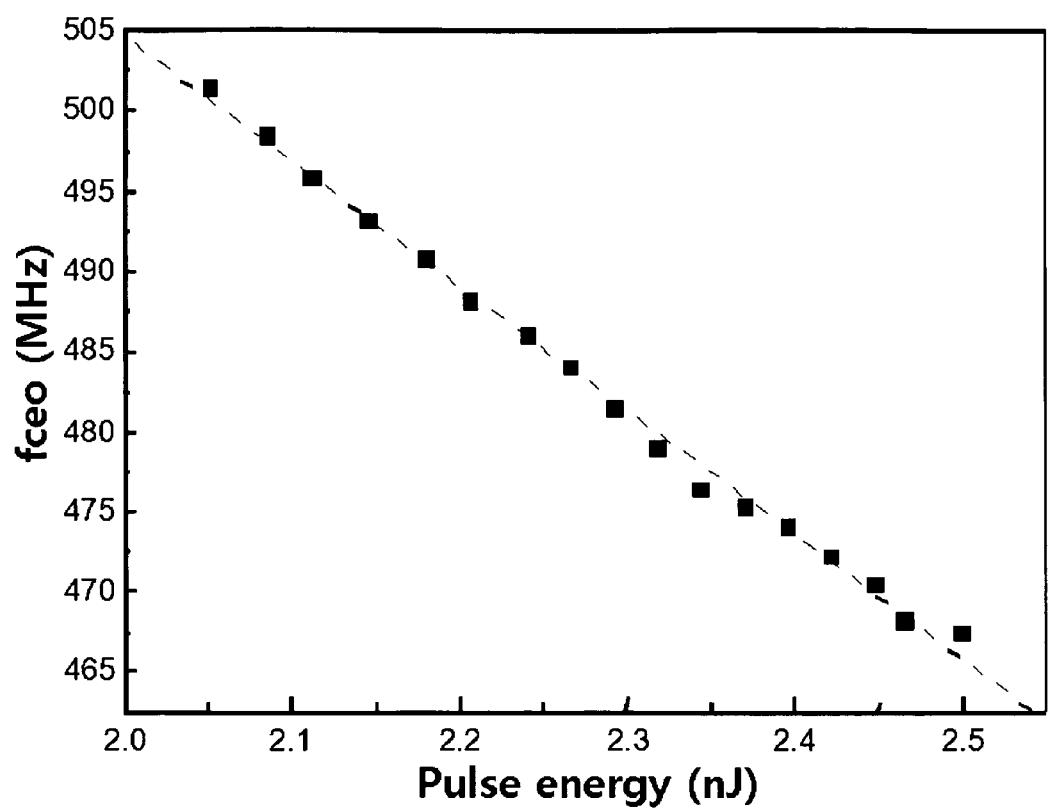
FIG. 7 is a graph showing a relationship between outputs of a laser pulse and a CEP offset frequency $f_{ceo}$ according to an example embodiment of the present invention.
Figure 8:
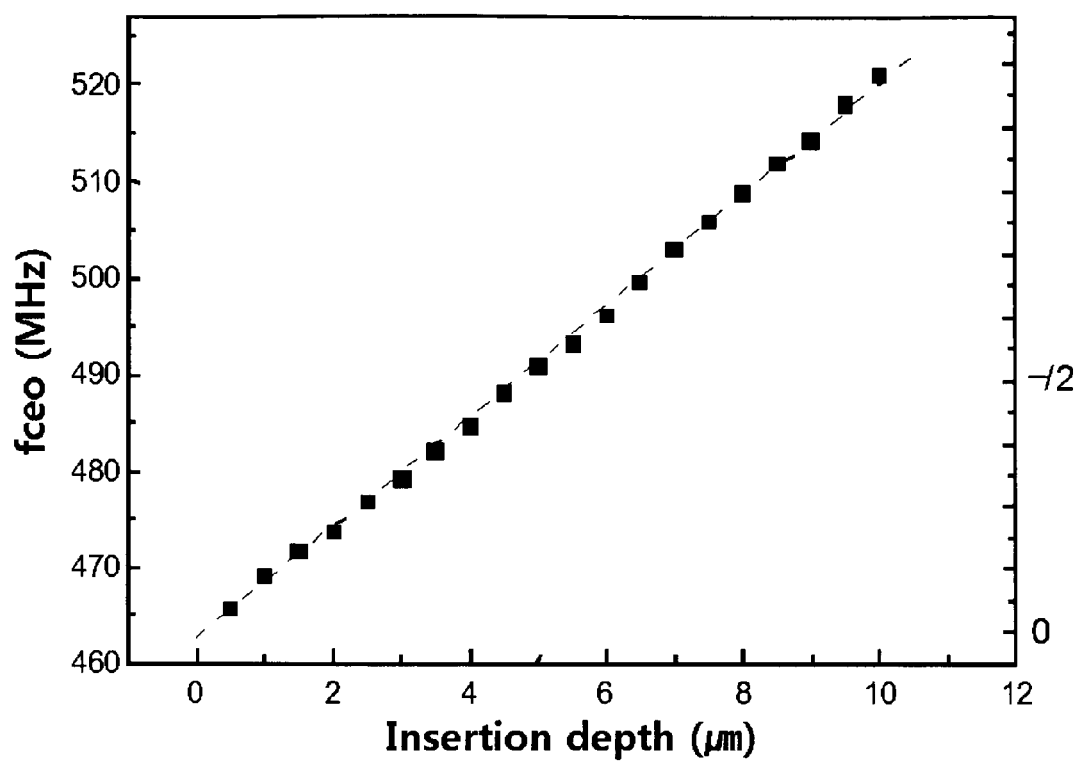
FIG. 8 is a graph showing a relationship between an insertion depth of a prism and the CEP offset frequency $f_{ceo}$ according to an example embodiment of the present invention.

FIG. 4 is a block diagram showing an apparatus for stabilizing the CEP of a laser pulse, which employs an improved DL method, according to an example embodiment of the present invention. FIG. 5 is a circuit diagram showing an apparatus for stabilizing the CEP of a laser pulse, which employs an improved DL method, according to an example embodiment of the present invention. FIG. 6 is a graph showing an octave spanning spectrum including $f_n$ frequency component and $f_{2n}$ frequency component which are outputs of a bandwidth broadener. FIG. 7 is a graph showing a relationship between outputs of a laser pulse and a CEP offset frequency $f_{ceo}$ according to an example embodiment of the present invention. FIG. 8 is a graph showing a relationship between an insertion depth of a prism and the CEP offset frequency $f_{ceo}$ according to an example embodiment of the present invention.

Referring to FIG. 4, an apparatus for stabilizing the CEP of a laser pulse includes a mode-locked pulsed laser 410, an interferometer 430, a detector 450, a double-feedback circuit 460 and a CEP stabilization control section 470. The detector 450 performs an operation of homodyne balanced detection (HBD). The detector 450 includes a first detector 445 and a second detector 440.

The mode-locked pulsed laser 410 generates laser pulses having a given repetition rate.

The interferometer 430 includes a bandwidth broadener 420, a harmonic beam splitter 422, a time delayer 425, a frequency doubler 426 and a beam combiner 438. The interferometer 430 generates laser pulses having $f_n$ frequency component and $f_{2n}$ frequency component in order to detect CEP of laser pulses outputted from the mode-locked pulsed laser 410 to generate a first interference signal 431 and a second interference signal 433. The laser pulse having $f_n$ frequency substantially corresponds to the laser pulse having $f_{2n}$ frequency in a time domain and in a space domain.

The bandwidth broadener 420 receives a laser pulse 403 to generate an octave spanning spectrum including the $f_n$ frequency component and $f_{2n}$ frequency component in order to detect CEP.

Referring to FIG. 6, the laser pulse 403 applied to the bandwidth broadener 420 is outputted from the bandwidth broadener 420 as the octave spanning spectrum including the $f_n$ frequency and $f_{2n}$ frequency.

The harmonic beam splitter 422 splits the octave spanning spectrum to separate $f_n$ frequency components 425 and $f_{2n}$ frequency components 423 in a space domain. The $f_n$ frequency components 425 are applied to the frequency doubler 426, and the $f_{2n}$ frequency components 423 are applied to the time delayer 424.

The frequency doubler 426 converts the $f_n$ frequency components 425 into $2f_n$ frequency components 429 having frequency that is two times greater than the $f_n$ frequency.

The time delayer 424 delays the $f_{2n}$ frequency components 423 by a given period in order to overlap the laser pulse of the $2f_n$ frequency component with the laser pulse of the $f_{2n}$ frequency component in a time domain.

A first polarization controller 432 divides the $f_{2n}$ frequency components 427 into S-polarization component and P-polarization component such that an amount of the S-polarization component and an amount of the P-polarization component are the same as each other. Then, the S-polarization component and the P-polarization component of the $f_{2n}$ frequency components are applied to the first detector 445 and the second detector 440, respectively.

A second polarization controller 434 divides the $2f_n$ frequency components 429 into S-polarization component and P-polarization component such that an amount of the S-polarization component and an amount of the P-polarization component are the same as each other. Then, the S-polarization component and the P-polarization component of the $2f_n$ frequency components are applied to the first detector 445 and the second detector 440, respectively.

The beam combiner 438 overlaps the laser pulse of the $2f_n$ frequency component with the laser pulse of the $f_{2n}$ frequency component in a space domain to generate the first and second interference signals 431 and 433. The first and second interference signals 431 and 433 are adjusted by the time delayer 424, the first and second polarization controllers 432 and 434 to be overlapped each other in the time domain and in the space domain, and are applied to the first and second detectors 445 and 440, respectively.

The detector 450 includes the first detector 445, the second detector 440 and the polarization phase shifter 439.

When the $2f_n$ frequency components and the $f_{2n}$ frequency components are precisely overlapped with each other in the time domain and in the space domain by the time delayer 424, the first polarization controller 432, the second polarization controller 434 and the beam combiner 438, the detector 450 detects an interference signal having noise factors and a CEP signal mixed therein. The noise factors are removed by a first feedback circuit 432, so that pure CEP signals are obtained.

The first detector 445 in FIG. 4 may include a first polarizer 553 and a first light detector 555 in FIG. 5, and the second detector 440 in FIG. 4 may include a second polarizer 559 and a second light detector 561 in FIG. 5. The first and second light detectors 555 and 561 receive a light signal to generate an electric signal.

The polarization phase shifter 439 inverts a phase of the interference signal of the second light detector 561 in the second detector 440. The polarization phase shifter 439 may operates as π-phase retarder by setting principle axis to be an S-polarization or a P-polarization without rotation of polarization.

The interference signals having low frequency variation noise factors and CEP signals mixed therein may be detected in the output signal of the first and second light detectors 555 and 561 in FIG. 5.

A difference between the interference signal of the first light detector 555 and the interference signal of the second light detector 561 may be adjusted to be a pure CEP signal by using the HBD method for the purpose of removing the noise factors of the laser pulse according to an example embodiment of the present invention.

In order that the difference between the interference signal of the first light detector 555 and the interference signal of the second light detector 561 becomes the pure CEP signal, two conditions are required.

According to a first condition, the beam combiner 438 divide the $2f_n$ frequency components passing through the second polarization controller 434 into a first divided $2f_n$ frequency component advancing toward the first detector 445 and a second divided $2f_n$ frequency component advancing toward the second detectors 440 such that an amount of the first divided $2f_n$ frequency component and an amount of the second divided $2f_n$ frequency component are the same as each other, and the beam combiner 438 divide the $f_{2n}$ frequency components passing through the first polarization controller 432 into a first divided $f_{2n}$ frequency component advancing toward the first detector 445 and a second divided $f_{2n}$ frequency component advancing toward the second detectors 440 such that an amount of the first divided $f_{2n}$ frequency component and an amount of the second divided $f_{2n}$ frequency component are the same as each other. When the first condition is satisfied, the magnitude of the interference signal of the first and second detectors 445 and 440 become exactly the same, so that a difference between a first interference signal 441 outputted from the first detector 445 and a second interference signal 443 outputted from the second detector 440 becomes always zero.

According to a second condition in which the difference between the interference signal of the first light detector 555 and the interference signal of the second light detector 561 is the pure CEP signals, the polarization phase shifter 439 is disposed in one of the first and second light detectors 445 and 440 to inverse the phase of the interference signal of one of the first and second light detectors 445 and 440. For example, the phase of the interference signal of the second light detector 561 in the second detector 440 may be inverted, and the phase of the CEP signal is inverted while the noise factors remain. As a result, a pure CEP signal may be obtained through the first feedback circuit 462.

The double-feedback circuit 460 includes a first feedback circuit 462 and a second feedback circuit 465. The double-feedback circuit 460 stabilizes the CEP of the laser pulse by combining the first and second feedback circuits 462 and 465. The double-feedback circuit 460 generates a high speed feedback signal such as a high speed control signal 461 and a low speed feedback signal such as a low speed control signal 467 to remove the phase difference between the laser pulses, so that the CEP value of the laser pulses has a same value.

The first feedback circuit 462 may include a differential amplifier 571 and a high speed servo 573 in FIG. 5. The first feedback circuit 432 receives the pure CEP signal generated by the differential amplifier 571 to generate the high speed control signal 461 for controlling the output of the mode-locked pulsed laser.

The second feedback circuit 465 may include a low speed servo 575 in FIG. 5. The second feedback circuit 465 generates the low speed control signal 467 for controlling an insertion amount of a prism 519 in order to control a degree of propagated distance of a laser pulse propagated in laser resonators 511, 513 and 526.

The CEP stabilization controller 470 includes a first CEP stabilization controller 472 and a second CEP stabilization controller 474.

The first CEP stabilization controller 472 controls an output of a laser pulse in order to control the CEP of the laser pulse in the mode-locked pulsed laser 410 based on the high speed control signal 461. The first CEP stabilization controller 472 may control the output of a laser pulse by using an acousto-optics modulator (AOM).

The second CEP stabilization controller 474 controls the degree of propagated distance of a laser pulse propagated in the laser resonator by controlling an insertion depth of the prism 519 based on the low speed control signal 467.

The apparatus for stabilizing the CEP of a laser pulse according to an example embodiment of the present invention measures the difference between the first and second interference signals 441 and 443 outputted from the detector 450 to directly obtain the CEP signal through the homodyne balanced detection (HBD) method in which the first and second detectors 445 and 440 are used. As a result, a change of the CEP of a laser pulse may be monitored in real time.

In order to control the CEP of each of the laser pulses in the mode-locked pulsed laser 410, the output of a laser is controlled by using the first CEP stabilization controller 472, or the insertion depth of the prism 519 for controlling the advancing distance of the laser propagated in a laser resonator is controlled by using the second CEP stabilization controller 474.

The first CEP stabilization controller 472 may include the AOM 503 as shown in FIG. 5. The AOM 503 may include crystal. When the high speed feedback signal having a given voltage, for example a voltage in a range from about zero volt to one volt, is applied to a first driver 578, the first driver 578 provides the AOM 503 with RF power, and an output intensity of ultrasonic waves is controlled according to the an intensity of the RF power. When the output intensity of the ultrasonic waves increases, the output power of a laser pulse decreases. That is, the output power of a laser pulse may be controlled by controlling the output of the ultrasonic wave of the AOM 503 by controlling the RF power level applied to the AOM 503.

The prism 519 may be an intracavity prism. The volume of the piezo-translator (PZT) controller increases depending upon an external voltage applied thereto The insertion depth of the prism 519 may be controlled by varying the external voltage using the second CEP stabilization controller 474.

In comparison with a method of controlling the CEP by using the PZT controller, a method of controlling the CEP by using the output power of the laser pulse through the AOM 503 is capable of high speed control.

When the CEP offset frequency $f_{ceo}$ of a laser pulse is zero, the CEP of the laser pulse has a constant value. Therefore, it is preferable to control the CEP offset frequency $f_{ceo}$ to be zero.

Therefore, the CEP offset frequency $f_{ceo}$ of a laser pulse may be controlled to be zero in the mode-locked pulsed laser 410 by controlling the output power of the laser power by using the first CEP stabilization controller 472 or by controlling the advancing distance of the laser propagated in a laser resonator by using the second CEP stabilization controller 474.

Referring to FIG. 7, a horizontal axis of pulse energy corresponds to an output of a laser pulse, and a vertical axis corresponds to the CEP offset frequency $f_{ceo}$. The CEP offset frequency $f_{ceo}$ is substantially zero, when the frequency of the vertical axis is about 485 MHz. As shown in FIG. 7, when the output of a laser pulse increases, the CEP offset frequency $f_{ceo}$ decreases.

Referring to FIG. 8, a horizontal axis corresponds to an insertion depth of a prism, and a vertical axis corresponds to the CEP offset frequency $f_{ceo}$. As shown in FIG. 8, when the insertion depth of a prism increases, the CEP offset frequency $f_{ceo}$ is also increases.

When an excessive RF power is applied to the AOM 503 while the AOM 503 is used by considering a response speed for controlling the CEP, the output of a laser is changed, so that error signal of the first feedback circuit 462 cause the increases of bias. Therefore, it is very hard to stabilize the CEP for more than one hour.

The method of controlling the CEP by using the insertion depth of the prism has a merit of not having influence on the output power of a laser. The method of controlling the CEP by using the AOM 503 has a merit of wide operation range, but has a difficulty in stably controlling the CEP due to the slow response of the PZT.

According to the method of the example embodiment of the present invention, two merits of the methods described above are combined. That is, the AOM 503 is used to quickly stabilize the CEP, and the PZT is used to slowly recover the CEP in spite of the change of the output power of the laser pulse. Therefore, the CEP of a laser pulse is stabilized for a long time in spite of environmental changes such as changes of temperature, humidity, etc.

Hereinafter, the apparatus for stabilizing CEP of a laser pulse, which employs the DL method according to an example embodiment of the present invention, will be explained referring to FIG. 5.

Referring to FIG. 5, the apparatus for stabilizing CEP of a laser pulse according to an example embodiment of the present invention includes a laser oscillator 510, an isolator 502, a dispersion compensator 515, an interferometer 530, a detector 550 and a double feedback circuit 570.

The laser oscillator 510 includes optical devices such as Nd:YV04 laser 501, laser resonators 511, 513 and 526, mirrors 505, 507 and 523, a lens 509, prisms 519 and 521, an output coupler 525, etc. The prism may be, for example, an intracavity prism.

The laser oscillator 510 may further include an AOM 503 for controlling an output of a laser under a control of the first driver 578 and a second driver 517 for controlling the advancing distance of a laser pulse propagated in the laser resonators by controlling the insertion depth of the prism 519.

A mirror-dispersion-controlled Kerr lens mode locked Ti:Sapphire laser generates, for example, femtosecond laser pulses having 75 MHz repetition rate.

The isolator 502 is used in order to prevent the back-reflection of the femtosecond laser pulses 527 generated by the laser oscillator 510 from a micro-structured fiber (MSF) 535 corresponding to the bandwidth broadener 420. The isolator 502 may be the Faraday isolator.

Since the isolator 502 has dispersion characteristics, a laser pulse is broadened so that non-linear effect is ineffectively generated in the bandwidth broadener 420. As a result, it is hard to generate $f_n$ frequency components and $f_{2n}$ frequency component. Therefore, the dispersion compensator 515 compensates for pulses broadened by the isolator 502 to have an original pulse shape. The dispersion compensator 515 includes, for example, prisms 512 and 514 and reflection mirrors 508 and 516. The dispersion compensator 515 is disposed between the laser oscillators 511, 513 and 526 and the interferometer 530, receives the outputs of the isolator 502, and compensates for the outputs of the isolator 502.

The interferometer 530 includes MSF 535, a non-linear crystal 545 and a time delayer 424. The non-linear crystal 545 may be, for example, KTP (potassium titanium oxide phosphate) crystal. The time delayer 424 includes, for example, a plurality of reflection mirrors 534, 536, 538 and 540.

The MSF 535 receives the output of the beam splitter 518 through a polarization controller 531 and a lens 533 to generate the octave spanning spectrum including both of $f_n$ frequency components (1064 nm) and $f_{2n}$ frequency components (532 nm). The polarization controller 531 may optimize the octave spanning spectrum.

The $f_n$ frequency components and the $f_{2n}$ frequency components sequentially pass through the lens 537 and the reflection mirror 539 to be separated from each other by a harmonic separation mirror (HS) 541. The $f_n$ frequency components pass through the lens 543, and KTP crystal 545 changes the $f_n$ frequency components to the $f_{2n}$ frequency components having two times greater frequency than the $f_n$ frequency components. The KTP crystal 545 has about 1 mm thickness. The output of the KTP crystal 545 sequentially passes through a lens 547, a band bass filter 548, a polarization controller 549 and a reflection mirror 546 to be applied to a polarization beam splitter (PBS) 551. The $f_{2n}$ frequency components are delayed by the reflection mirrors 532, 536, 534, 538 and 540, and passes through a band pass filter 542 and a polarization controller 544 to be applied to a PBS 551. The PBS 551 may divide the $f_{2n}$ frequency components into a first portion advancing toward the first detector 445 and a second portion advancing toward the second detector 440, such that the amount of the first and second portions is maintained to be the same as each other by controlling the polarization controller 544. The PBS 551 also divides the $2f_n$ frequency components into a first portion advancing toward the first detector 445 and a second portion advancing toward the second detector 440 such that an amount of the first portion and an amount of the second portion of the $2f_n$ frequency components are maintained to be the same each other by controlling the polarization controller 549.

The PBS operates as a beam combiner that remerges the $f_{2n}$ frequency components and the $2f_n$ frequency components.

The detector 550 corresponds to the detector 450 in FIG. 4, and performs the HBD operation.

The detector 550 includes a first polarizer 553, a first light detector 555, a halfwave plate (HWP) 557, a second polarizer 559 and a second light detector 561. The first and second light detectors 555 and 561 may include an avalanche photodiode (APD).

The $f_{2n}$ frequency components and the $2f_n$ frequency components from the interferometer 530 are remerged by the PBS 551 such that the $f_{2n}$ frequency components and the $2f_n$ frequency components may be overlapped each other in a time domain and in a space domain, and then divided into first and second interference signals for the HBD operation.

In order that the first and second interference signals ($2f_n$ and $f_{2n}$) interfere with each other, the first and second interference signals should have the same polarization direction while the first and second interference signals are overlapped with each other in a time domain and a space domain. When the polarization directions of the first and second interference signals are substantially perpendicular to each other, the first and second interference signals do not interfere with each other. The first and second interference signals may have the same polarization direction by arranging the first and second polarizers 553 and 559 such that polarization axes of the first and second polarizers 553 and 559 form an angle of about forty five degrees. The first and second interference signals may be simultaneously detected by the first and second detectors 555 and 561 since the first and second interference signals have the same polarization axes by the first and second polarizers 553 and 559 to interfere with each other. The following Equation 1 and Equation 2 show interference signals of the first and second light detectors 555 and 561, respectively.

$$V_1(t) = V_{f_{2n}}^S(t) + V_{2f_n}^P(t) + 2\sqrt{V_{f_{2n}}^S(t) \cdot V_{2f_n}^P(t)} \sin \phi_{cep}(t), \quad \text{Equation 1}$$

$$V_2(t) = V_{f_{2n}}^P(t) + V_{2f_n}^S(t) + 2\sqrt{V_{f_{2n}}^P(t) \cdot V_{2f_n}^S(t)} \sin \phi_{cep}(t), \quad \text{Equation 2}$$

wherein, $V_1(t)$ and $V_2(t)$ represent inputs 554 and 556 of the first and second light detectors 555 and 561, respectively. The $V_1(t)$ and $V_2(t)$ are interference signals having different noise factors. The first two elements $V_{f_{2n}}^S(t) + V_{2f_n}^P(t)$ and $V_{f_{2n}}^P(t) + V_{2f_n}^S(t)$ in Equations 1 and 2 correspond to varying noise factors, and the last AC components correspond to the CEP signal.

The polarization controllers 544 and 549 and the HWP 557 are disposed adjacent to the PBS 551 for the purpose of precise balance between two interference signals outputted from the first and second light detectors 555 and 561. By controlling the polarization controllers 544 and 549, the first and second light detectors 555 and 561 may be controlled to output the interference signals having the same strength. In other words, the first and second light detectors 555 and 561 may be controlled such that the outputs of the first and second light detectors 555 and 561 are balanced in order that output of the differential amplifier is zero.

In the HBD detection method according to an example embodiment of the present invention, an HWP 557 operating as a polarization phase delayer may be additionally disposed before the second light detector 561 in order that the interference signal of the second light detector 561 has the same intensity as that of the interference signal of the first light detector 555.

Then, as shown in following Equation 3, the phase of the CEP signals in the output signal of the second light detector 561 is inverted by the HWP 557 operating as the polarization phase delayer, while the noise factors in the output signal of the second light detector 561 remain.

$$V_2(t) = V_{f_{2n}}^P(t) + V_{2f_n}^S(t) - 2\sqrt{V_{f_{2n}}^P(t) \cdot V_{2f_n}^S(t)} \sin \phi_{cep}(t) \quad \text{Equation 3}$$

When the principle axis of the HWP 557 is set to be the S-polarization direction or the P-polarization direction, the HWP 557 operates as the $\pi$-phase retarder, so that the low frequency fluctuation noise of the first and second light detectors 555 and 561 may be removed.

The $V_{f_{2n}}(t)$ and $V_{2f_n}(t)$ correspond to $f_{2n}$-arm and $2f_n$-arm of the interferometer 530, respectively. The $V_{f_{2n}}(t)$ may classified as $V_{f_{2n}}^S(t)$ and $V_{f_{2n}}^P(t)$, and the $V_{2f_n}(t)$ may be classified as $V_{2f_n}^S(t)$ and $V_{2f_n}^P(t)$ according to a direction of the polarization axis.

When the $f_{2n}$-arm and the $2f_n$-arm use two polarization controllers 544 and 549, the S-polarization components may be controlled to be the same amount as that of the P-polarization components. The two polarization controllers 544 and 549 in the interferometer 530 may be adjusted, while one of the $f_{2n}$-arm and the $2f_n$-arm is blocked (or inactivated), in order that the interference signals of the first and second light detectors 555 and 561 may be the same as each other. Additionally, the gain and offset of each of the first and second light detectors 555 and 561 may be set to have same value. Therefore, the intensity of the signals detected by the first and second light detectors 555 and 561 may be equalized.

As a result, the output 572 of the differential amplifier 571 may be obtained according to the following Equation 4, and the noise such as the low frequency fluctuation noise may be removed, so that a CEP signal that is two time greater than the CEP signal obtained from the conventional DL method may be obtained from the difference between the third interference signal outputted from the first light detector 555 and the fourth interference signal outputted from the second light detector 561

$$V_{err}(t) = V_1(t) - V_2(t) = 4\sqrt{V_{f_{2n}}(t) \cdot V_{2f_n}(t)} \sin \phi_{cep}(t) \approx 4\sqrt{V_{f_{2n}}(t) \cdot V_{2f_n}(t)} \cdot \phi_{cep}(t) \quad \text{Equation 4}$$

The double feedback circuit 570 includes the first feedback circuit 462 and the second feedback circuit 465. The first feedback circuit 462 includes a differential amplifier 571 and a high speed servo 573. The second feedback circuit 465 includes a low speed servo 575.

The differential amplifier 571 receives the interference signal outputted from the first light detector 555 through a non-inversion input terminal, and the interference signal outputted from the second light detector 561 through an inversion input terminal. The differential amplifier 571 cancels the interference signals outputted from the first and second light detectors 555 and 561 so that the output signal of the differential amplifier 571 becomes zero when the interference signals outputted from the first and second light detectors 555 and 561 are adjusted to have a same value as each other.

The high speed servo 573 may include a proportional integral derivative (PID) control circuit. The high speed servo 573 may be implemented only by an integrator. Even when the high speed servo 573 is implemented only by an integrator, the CEP stabilizing operation may be stably performed. The high speed servo 573 receives the output 572 of the differential amplifier 571, and integrates the output 572 to output a voltage signal as the high speed feedback signal 577 for driving the first driver 578. The first driver 578 controls the RF power level of the output signal according to the output voltage of the high speed servo 573, and then provides the AOM 503 with the output signal of which RF power level is controlled.

The low speed servo 575 may include a PID control circuit. The low speed servo 575 may include, for example, an integrator (I) and a proportional (P) element. The low speed servo 575 receives the output of the high speed servo 573 to out a voltage signal as a low speed feedback signal 579 for driving the second driver 517. The second driver 517 controls the insertion depth of the prism 519 by amplifying the voltage output of the low speed servo 575.

The following Equations 5 and 6 show the interference signals detected by APD1 and APD2 disclosed in FIG. 1 of the thesis "Novel method for carrier-envelope phase stabilization of femtosecond laser pulses" for a simple DL method, which is disclosed on Apr. 18, 2005 through the journal of OPTICS Express, in order to compare the simple DL method and the improved DL method according to an example embodiment of the present invention.

$$V_1(t) = G_1 \times \left(V_{f_{2n}}^S + V_{2f_n}^P(t) + 2\sqrt{\left(V_{f_{2n}}^S + V_{2f_n}^P\right)} \sin\phi_{cep}(t)\cos^2\left(\frac{\pi}{4}\right)\right) \quad \text{Equation 5}$$

$$V_2(t) = G_2 \times \left(V_{f_{2n}}^P(t) + V_{2f_n}^S(t)\right) \quad \text{Equation 6}$$

wherein $G_1$ and $G_2$ represent gains of the APD1 and APD2 disclosed in FIG. 1 of the above thesis, respectively, $V_1$ and $V_2$ represent the intensity of the output signals of the APD1 and APD2 disclosed in FIG. 1 of the above thesis. The super scrip 'S' and 'P' represent the polarization state. The $\phi_{cep}(t)$ represents a variation of CEP in accordance with time. Especially, $V_2(t)$ represents the noise factors generated by the interferometer 530 detecting instability of a laser output and an CEP signal, and the $\cos^2(\pi/4)$ is a factor induced by the polarization axis of the polarizer disposed before the APD1 in FIG. 1 of the thesis.

According to the conventional CEP stabilization techniques disclosed in the above U.S. Pat. No. 6,724,788 and U.S. Patent Publication No. 2004/0017833, which is based on the conventional PLL method, the CEP offset frequency $f_{ceo}$ has a fixed value of $f_{rep}/N$, wherein $f_{rep}$ is the repetition rate. The fact that the CEP offset frequency $f_{ceo}$ has a fixed value means that the CEO $\Delta \phi_{cep}(=2\pi \ast f_{ceo}/f_{rep})$ has also a fixed value. The fact that the CEO $\Delta \phi_{cep}$ has a fixed value means that pulses generated by the mode-locked pulsed laser are repeated every N pulses.

In the DL method, the left side in Equation 5 means the interference signal, and first term in the right side in Equation 5 means a noise factor, and second term $\sin \phi_{cep}(t)$ in the right side in Equation 5 means the pure AC components or CEP signal. In the second term in the right side in Equation 5, the sin function is non-linear in a region of $-\pi/2$ to $\pi/2$, but may be considered as linear in a narrow region adjacent to zero to generate linear error signal for feedback.

In order to extract the CEP signal that corresponds to the pure AC component from the interference signal, the DC components are measured, respectively by using the APD2 in FIG. 1 of the thesis.

The apparatus for stabilizing a carrier-envelope phase of a laser pulse according to an example of the present invention removes the noise factor in the V1 signal of the first light detector 555 by using the differential amplifier 571 in FIG. 5 to directly extract the CEP signal from the interference signal without using the electrical phase detector employed in the simple DL method disclosed in the thesis.

The CEP locking method according to an example embodiment of the present invention removes the noise factor to extract the CEP signal by using the interference signals $V_2$ and $V_1$. Thanks to the first polarizer 553 disposed before the first light detector 555, the intensity of signal $V_2$ is a half of the intensity of signal $V_1$, the gain parameters $G_1$ and $G_2$ of the first and second light detectors 555 and 561 are controlled to remove the DC variation $(V_{f_{2n}(t)+V_{2f_n}}^{S}(t))$. That is, the gain parameter $G_1$ should be adjusted such that the intensity of the gain parameter $G_1$ is two times greater than the intensity of the gain parameter $G_2$. However, the gain parameter $G_1$ cannot be exactly two times greater than the intensity of the gain parameter $G_2$ and response curves are slightly different from each other, since the light detector including the APD operates in the non-linear saturation region. This kind of uncertainty may induce a slight error in a feedback process.

Furthermore, the noise signal cannot be perfectly removed by only gain control between the APD1 and APD2 disclosed in FIG. 1 of the thesis of the conventional DL method, since the relation between $V_{fn}(t)$ and $V_{2fn}(t)$ ($\infty |V_{fn}(t)|^2$) is not linear in a time domain because $V_{2fn}(t)$ relates to the second harmonic process of $V_{fn}(t)$. Even through the noise seems to be removed at a time point when the amplification factor of the APD1 and APD2 is adjusted, the noise may be seem as the CEP signal according as time goes by. The experimental result in FIG. 9 shows above mentioned explanation.

Figure 9:
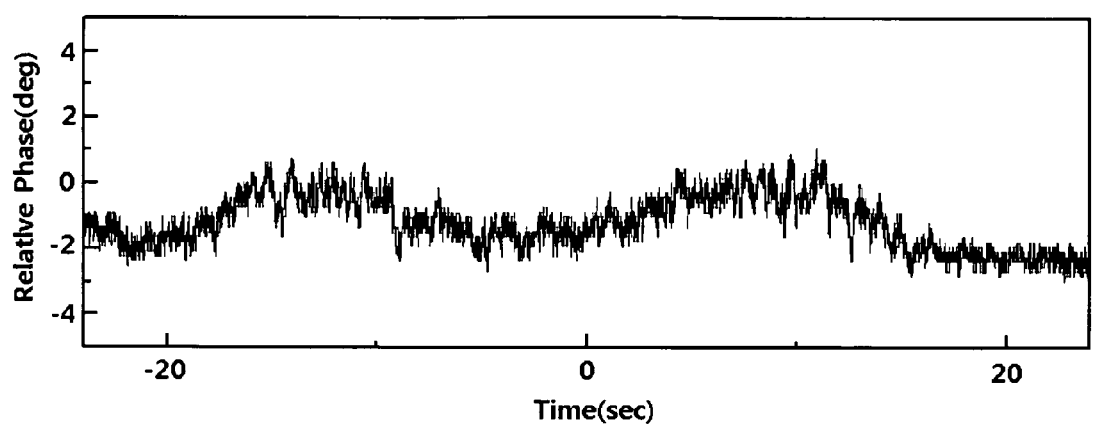
FIG. 9 is a graph showing an example of distorted phase error signal in a conventional direct locked method.

FIG. 9 is a graph showing an example of distorted phase error signal in a conventional direct locked method.

When the interferometer 430 and the time delayer 424 are disposed at wrong positions such that the CEP is not measured, only the noise factors in the interference signal which is mixed with the noise factors and the CEP signals are measured. When the first and second detectors 445 and 440 are perfectly balanced, the interference signal should be always zero, regardless of the noise signal. However, the distorted signal is shown as shown in FIG. 9 due to the problems described above.

Therefore, the HBD method according to an example embodiment of the present invention has been introduced to solve the problems induced by the distortion of the CEP signal.

The apparatus for stabilizing a carrier-envelope phase of a laser pulse according to an example embodiment of the present invention, which employs the improved DL method, divides the $2f_n$ frequency components into first and second portions having the same amount as each other by the second polarization controller 434, and the first and second portions of the $2f_n$ frequency components are applied to the first and second light detectors 555 and 561, respectively. The apparatus for stabilizing a carrier-envelope phase of a laser pulse according to an example embodiment of the present invention also divides the f2n frequency components into first and second portions having the same amount as each other, and the first and second portions of the f2n frequency components are applied to the first and second light detectors 555 and 561, respectively. The phase of the interference signal of the second light detector 561 is inverted by the polarization phase shifter 439 inserted before the second detector so that the phase of the CEP signal is inverted while the noise factors remains. Finally, the apparatus for stabilizing a carrier-envelope phase of a laser pulse according to an example embodiment of the present invention removes the noise factors of the $V_1$ signal of the first light detector 555 to extract the pure CEP signal $\sin \phi_{cep}(t)$ from the interference signal.

Figure 10:
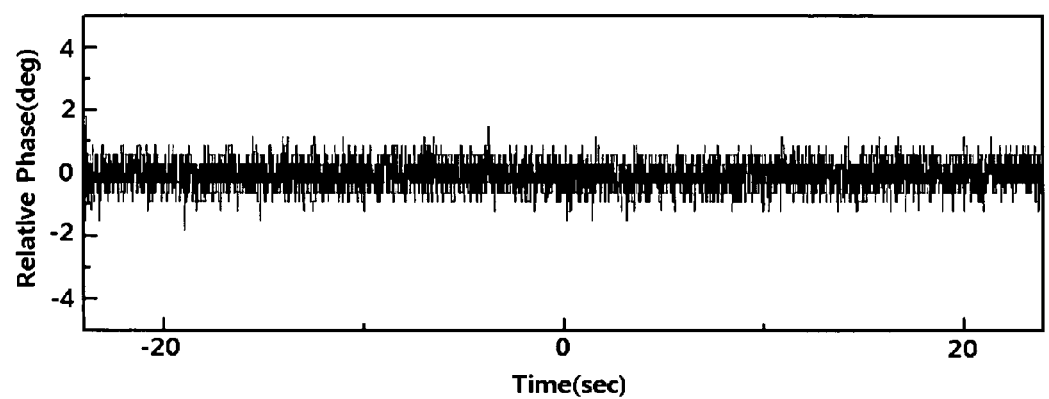
FIG. 10 is a graph showing an error signal from an interference signal of a first light detector and a second light detector which are balanced using an improved direct locked method according an example embodiment of the present invention.

FIG. 10 is a graph showing an error signal from an interference signal of a first light detector and a second light detector which are balanced using an improved direct locked method according an example embodiment of the present invention. The error signal represents the output signal of the differential amplifier 571. The pure interference signal has very high frequency, and thus is filtered by a band pass filter of the APD, so that the pure interference signal is not shown in FIG. 10.

Referring to FIG. 10, the electric gains of the light detectors 555 and 561 are set to be equal to each other, so that the phase distortion induced by the noise is perfectly removed.

Furthermore, the intensity of the CEP signal is two times greater than that of the conventional DL method as shown in Equation 4. Therefore, the signal-to-noise ratio may be enhanced and the CEP stability may be enhanced in a locking condition.

The presupposition of the above may be confirmed through an experiment on a basis of the HBD method according to an example embodiment of the present invention. The CEP of the interference signals outputted from the first and second light detectors 555 and 561 was measured, and the CEP offset frequency $f_{ceo}$ was tuned to be zero by manually controlling, for example, the intracavity prism 519. When the CEP offset frequency $f_{ceo}$ becomes under the operation range (or equal to or less than about 100 kHz), a direct locked loop starts operating.

Figure 11:
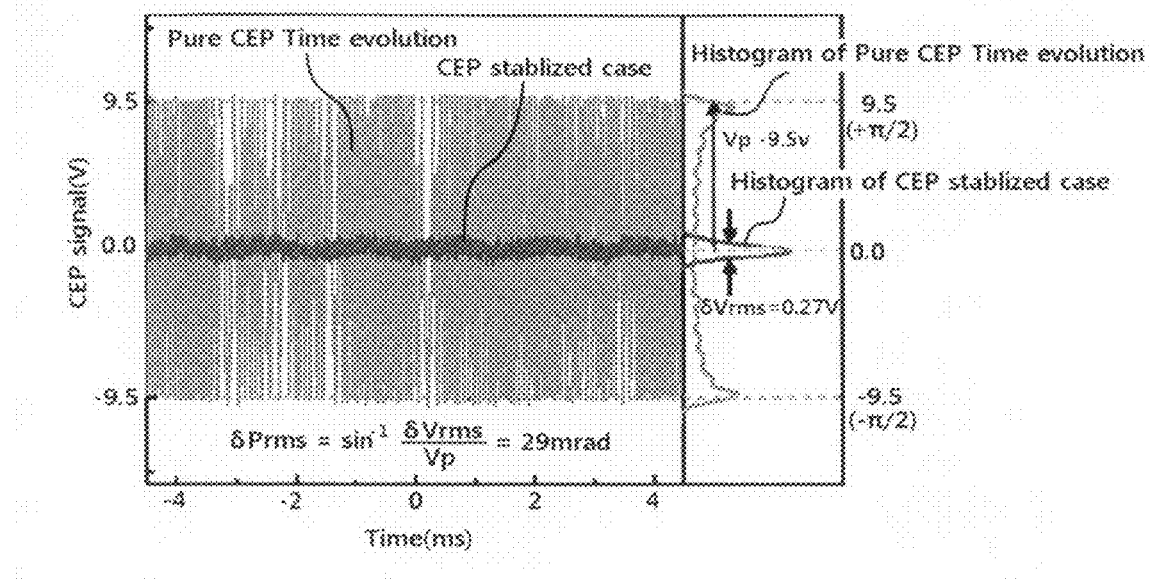
FIG. 11 is a graph showing changes of output of a differential amplifier of a first feedback circuit before and after activating a direct locked loop as time goes by according an example embodiment of the present invention.

FIG. 11 is a graph showing a short-term changes of the output of a differential amplifier of a first feedback circuit before and after activating a direct locked loop as time goes by according an example embodiment of the present invention. An oscillation structure in a non-locked condition vanishes, and is changed into a DC signal in a locked condition.

Only an operation of the AOM by the high speed feedback operation of the high speed servo 573 relates to the CEP locking in a time range of less than one second.

In comparison with the CEP stabilization method based on the conventional PLL, the improved direct locking method according to an example embodiment of the present invention may provide CEP information at an output terminal of the differential amplifier 571 through a digital oscilloscope. In case of stabilized CEP, the CEP variation may be estimated by measuring the rms voltage. In case of the time evolution of the pure CEP, the CEP variation may be simply estimated by measuring the peak-to-peak voltage.

The CEP histogram shown in the right side of FIG. 11 shows clearly the characteristics of the stabilized CEP. The rms phase jitter calculated by FIG. 11 is about 29 mrad corresponding to 13 attosecond.

Figure 12:
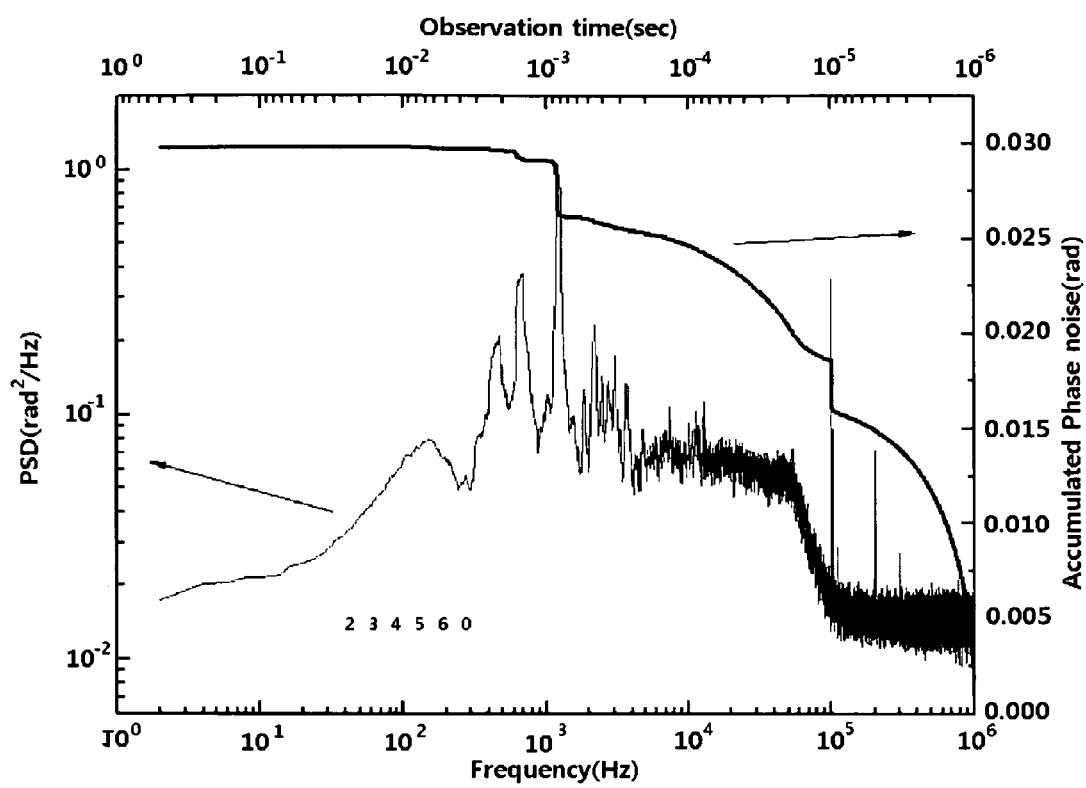
FIG. 12 is a graph showing a power spectrum density curve and accumulated phase noises outputted from a beat signal in a CEP locked state, which is outputted from the differential amplifier of the first feedback circuit.

FIG. 12 is a graph showing a power spectrum density curve and accumulated phase noises outputted from a beat signal in a CEP locked state, which is outputted from the differential amplifier of the first feedback circuit.

Referring to FIG. 12, the phase noise in a range of about several microsecond to one second is about 30 mrad. This result coincides with the result of the FIG. 11. In the thesis relating the conventional DL method, the phase noise of an in-loop was 50 mrad. In comparison with the conventional DL method, according to the improved DL method of the present invention, the phase noise of the improved DL method is reduced two times as much, which may be anticipated by Equation 5. The reduced phase noise shows that the operation of the direct DL may be enhanced by employing the HBD method.

In the present invention, the double feedback method is introduced for stabilizing long-term CEP. A pump power modulation method using only the AOM, has demerits in long term stability respects. The CEP offset frequency $f_{ceo}$ drift, which is generated in long-term operation, may greatly change the output power of a pump laser, so that mode-locking of a laser oscillator may be turned off to be stopped. The CEP offset frequency $f_{ceo}$ is fixed to be zero in the conventional DL method, and is fixed to be $f_{ceo}=f_{rep}/N$ in the conventional PLL method, so that the problems induced by the CEP offset frequency $f_{ceo}$ drift appear in the conventional DL method and the conventional PLL method. When the mode-locking does not exist, the accumulated pulse-to-pulse CEP variation ($\Delta \phi_{cep}=2\pi^* f_{ceo}/f_{rep}$) has a value of several radians, the feedback process for locking CEP may stop the mode-locking due to the excessive variation of pump power.

In order to solve the above problems, according to one example embodiment of the present invention, the low speed servo 575 driving the PZT for controlling the insertion depth of the prism 519 is used as shown in FIG. 5.

The prism 519 may control the pulse-to-pulse CEP variation $\Delta \phi_{cep}$ without making influence on the output power of a pump laser or without making influence on the mode-locking condition when the dispersion variation is small enough. Therefore, controlling the insertion depth of the prism as a low speed feedback method allows the CEP drift in a high dynamic range, and is proper for a long-term operation.

By combining the high speed servo 573 with the low speed servo 575, the long-term CEP stabilization operation may be enhanced. In order to embody the double feedback method according to an example embodiment of the present invention, two integrated circuits having different cut-off frequencies may be disposed after the subtraction circuit 571. For example, the cut-off frequency of the high speed servo 573 is about 30 kHz, and the cut-off frequency of the low speed servo 575 is about 0.3 kHz. Therefore, the low speed feedback loop operates only in a long time scale of more than one second.

Figure 13:
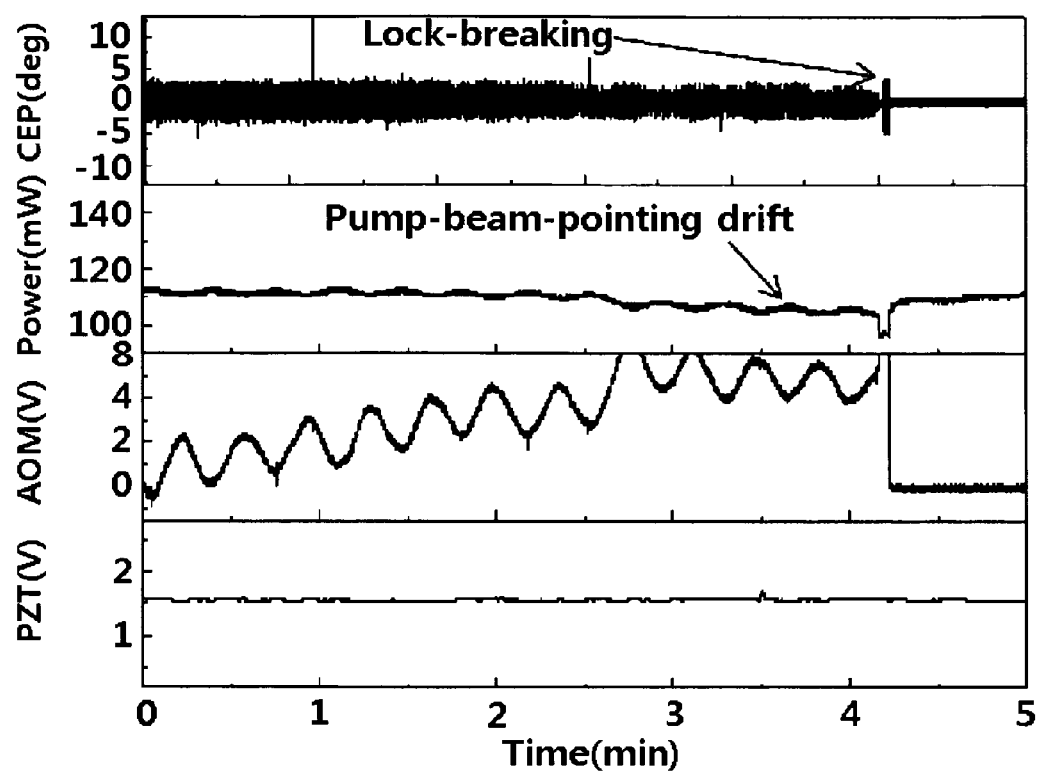
FIG. 13 is a graph showing a simulation result when a slow feedback loop does not operate in the improved direct locked method according an example embodiment of the present invention.
Figure 14:
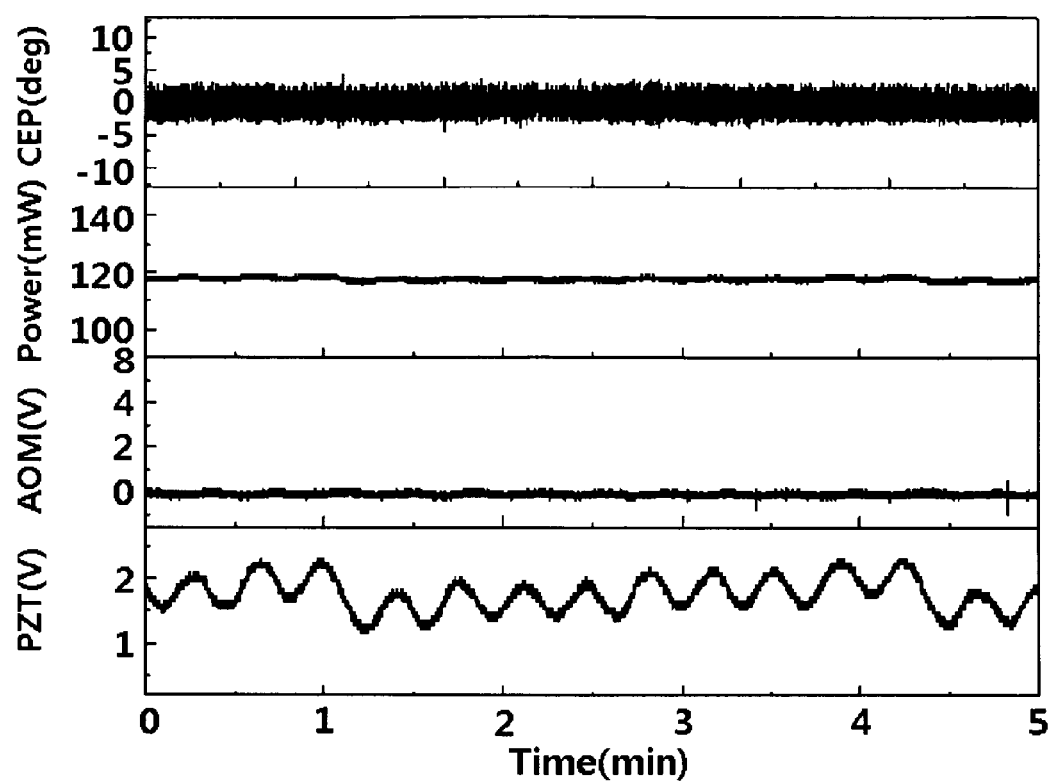
FIG. 14 is a graph showing a simulation result when the slow feedback loop operates in the improved direct locked method according an example embodiment of the present invention.

FIG. 13 is a graph showing a simulation result when a slow feedback loop does not operate in the improved direct locked method according an example embodiment of the present invention, and FIG. 14 is a graph showing a simulation result when the slow feedback loop operates in the improved direct locked method according an example embodiment of the present invention.

Referring to FIG. 13, the CEP locking is maintained only by AOM, and the low speed drift of the AOM signal excesses a controllable range, and thus the CEP locking after about four minutes later is broken. As shown in FIG. 13, when the average RF power provided by the AOM 503 is slowly shifted, pump-beam-pointing is slowly shifted due to a change of temperature of the AOM 503, and the pump-beam-pointing shift causes the unstability of the femtosecond laser oscillator. As a result, the CEP locking cannot be maintained. In case of FIG. 13, the CEP locking cannot be maintained for more than about four minutes.

However, when the slow drift of the pump-beam-pointing is controlled by the PZT, the long-term operation is made to be possible as shown in FIG. 14.

Referring to FIG. 14, the average RF power drift applied to the AOM 503 is much smaller than that of FIG. 13. As a result, the laser oscillator may stably operate without the pumpbeam-pointing drift induced by the temperature change of the AOM 503. Regular slow modulation of the low speed feedback signal in a range of less than about thirty seconds may be detected. When a low frequency noise is carefully checked, it can be shown that the variation of pump power, which is induced by the variation of a chiller cooling the pump laser, is very small for the above time period. However, the drift of the pump power shows that the double feedback loop method is required for long-term stable operation.

The CEP locking operation is enhanced under severe condition thanks to the double feedback loop according to an example embodiment of the present invention.

Figure 15:
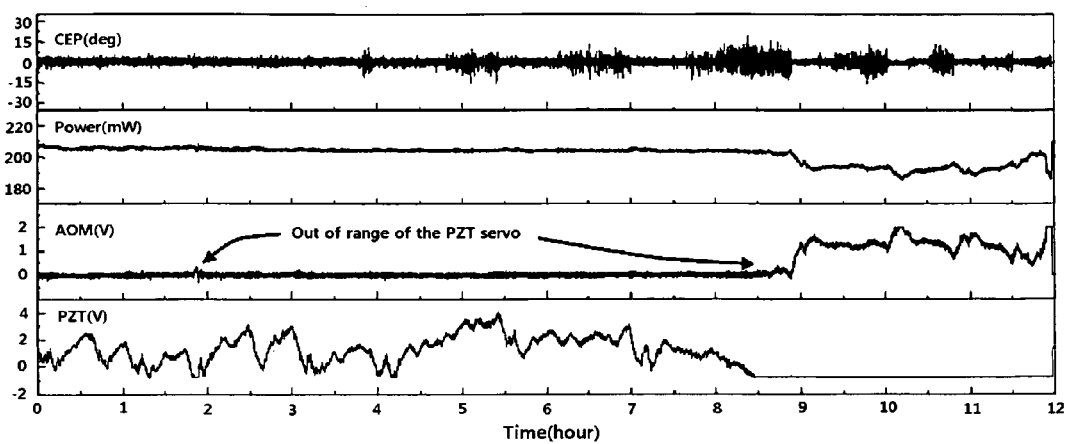
FIG. 15 is a simulation result when a double feedback loop is employed according an example embodiment of the present invention.

FIG. 15 is a simulation result when a double feedback loop is employed according an example embodiment of the present invention.

Referring to FIG. 15, when the chiller is replaced to have smaller temperature variation in comparison with the apparatus for stabilizing CEP, which is used for the simulation, and the AOM having enhanced thermal conductivity for stabilizing the CEP is formed, the long-term (more than twelve hours) CEP locking operation may be obtained as shown in FIG. 15. The CEP stabilization hour was about nine hours due to the lack of the dynamic range of the PZT servo. As a result, the RF pump power drift is induced on the AOM, and the average laser power varies as shown in FIG. 15. As a result, the CEP locking is interrupted due to the AOM thermal problems. However, the CEP locking was maintained for three hours thanks to the enhanced AOM. The CEP locking may be maintained when the low speed feedback loop is in a range of the PZE servo.

The HBD method according to an example embodiment of the present invention can reduce the CEP noise two times as much, and the double feedback method according to an example embodiment of the present invention can maintain the CEP stabilization operation for a long-term (more than about twelve hours).

While the example embodiments of the present invention and their advantages have been described in detail, it should be understood that various changes, substitutions and alterations may be made herein without departing from the scope of the invention.

What is claimed is:

1. An apparatus for stabilizing a carrier-envelope phase (CEP) of a laser pulse generated by a mode locked pulsed laser based on a direct locking method, the apparatus comprising:
    a laser oscillator including the mode locked pulsed laser generating the laser pulse;
    an interferometer generating laser pulses having first and second frequency components from the laser pulse generated by the mode locked pulsed laser to generate first and second interference signals that substantially correspond to each other in a time domain and a space domain;
    a detector receiving the first and second interference signals to output third and fourth interference signals by inverting a phase of the second interference signal; and
    a double feedback circuit controlling the laser oscillator so that the carrier-envelope phase (CEP) of the laser pulse generated by the mode locked pulsed laser has substantially a constant value with respect to time using a carrier-envelope phase (CEP) signal obtained from the third and fourth interference signals.

2. The apparatus of claim 1, wherein the interferometer comprises:
    a time delayer delaying the first frequency component by a given time in order to overlap the first frequency component with the second frequency component in the time domain; and
    a frequency doubler that doubles a frequency of the second frequency component.

3. The apparatus of claim 2, wherein the interferometer further comprises:
    a first polarization controller dividing the first frequency component into an S-polarization portion and a P-polarization portion, the S-polarization portion and the P-polarization portion of the first frequency component respectively having a same amount;
    a second polarization controller dividing the second frequency component into an S-polarization portion and a P-polarization portion, the S-polarization portion and the P-polarization portion of the second frequency component respectively having a same amount; and
    a beam combiner overlapping the first and second frequency components, respectively divided by the first and second polarization controllers, in the space domain to generate the first and second interference signals.

4. The apparatus of claim 1, wherein the detector comprises:
    a first detector performing a photo-electric conversion on the first interference signal;
    a polarization phase shifter inverting a phase of the second interference signal; and
    second detector performing the photo-electric conversion on an output of the polarization phase shifter.

5. The apparatus of claim 4, wherein the first and second detectors respectively comprise third and fourth polarization controllers adjusting polarization axes of the first and second interference signals to be substantially parallel with each other.

6. The apparatus of claim 1, wherein the double feedback circuit comprises:
    a first feedback circuit canceling noise factors of the third and fourth interference signals, and generating a high speed feedback signal for controlling an output of the laser pulse generated by the mode locked pulsed laser; and
    a second feedback circuit receiving the high speed feedback signal to generate a low speed feedback signal for controlling an insertion depth of a prism of the laser oscillator.

7. The apparatus of claim 6, wherein the output of the laser pulse generated by the mode locked pulsed laser is controlled based on the high speed feedback signal by using an acousto-optics modulator, and
    wherein the insertion depth of the prism of the laser oscillator is controlled based on the low speed feedback signal by using a piezo-translator controller.

8. The apparatus of claim 6, wherein a carrier-envelope phase (CEP) offset frequency of the laser pulse generated by the laser oscillator is changed by changing an output of the laser pulse generated by the mode locked pulsed laser, based on the high speed feedback signal, and
    wherein the carrier-envelope phase (CEP) offset frequency of the laser pulse generated by the laser oscillator is changed by increasing the insertion depth of the prism of the laser oscillator, based on the low speed feedback signal.

9. The apparatus of claim 6, wherein the first feedback circuit comprises a differential amplifier canceling the noise factors of the third and fourth interference signals.

10. The apparatus of claim 9, wherein the carrier-envelope phase (CEP) signal obtained from the third and fourth interference signals corresponds to an output of the differential amplifier.

11. A method for stabilizing a carrier-envelope phase (CEP) of a laser pulse generated by a mode locked pulsed laser based on a direct locking method, the method comprising:

generating a laser pulse including first and second frequency components from the laser pulse generated by the mode locked pulsed laser of a laser oscillator to generate first and second interference signals overlapping with each other in a time domain and in a space domain;

receiving the first and second interference signals to invert a phase of the second interference signal in order to generate third and fourth interference signals;

generating a high speed feedback signal and a low speed feedback signal for controlling the laser oscillator so that the carrier-envelope phase (CEP) of the laser pulse generated by the mode locked pulsed laser has substantially a constant value with respect to time using a carrier-envelope phase (CEP) signal obtained from the third and fourth interference signals; and stabilizing the carrier-envelope phase (CEP) of the laser pulse generated by the mode locked pulsed laser, based on the high speed feedback signal and the low speed feedback signal.

12. The method of claim 11, wherein generating the laser pulse including the first and second frequency components from the laser pulse generated by the mode locked pulsed laser of the laser oscillator to generate the first and second interference signals overlapping with each other in the time domain and in the space domain comprises delaying the first frequency component by a given time to generate a delayed first frequency component.

13. The method of claim 12, wherein generating the laser pulse including the first and second frequency components from the laser pulse generated by the mode locked pulsed laser of the laser oscillator to generate the first and second interference signals overlapping with each other in the time domain and in the space domain further comprises:

dividing the delayed first frequency component into an S-polarization portion and a P-polarization portion, the S-polarization portion and the P-polarization portion of the delayed first frequency component respectively having a same amount;

dividing the second frequency component into an S-polarization portion and a P-polarization portion, the S-polarization portion and the P-polarization portion of the second frequency component respectively having a same amount; and overlapping the divided first and second frequency components in the space domain to generate the first and second interference signals.

14. The method of claim 11, further comprising adjusting polarization axes of the first and second interference signals to be substantially parallel with each other.

15. The method of claim 11, wherein generating the high speed feedback signal and the low speed feedback signal comprises:

generating the high speed feedback signal for canceling noise factors of the third and fourth interference signals and for controlling an output of the laser pulse generated by the mode locked pulsed laser; and generating the low speed feedback signal for controlling an insertion depth of a prism of the laser oscillator, the prism controlling a degree of propagated distance of a laser pulse propagated in a cavity of the laser oscillator.

16. The method of claim 11, wherein stabilizing the carrier-envelope phase (CEP) of the laser pulse generated by the mode locked pulsed laser, based on the high speed feedback signal and the low speed feedback signal, comprises:

controlling an output of the laser pulse generated by the mode locked pulsed laser, based on the high speed feedback signal; and controlling a degree of a propagated distance of a laser pulse propagating in a cavity of the laser oscillator by controlling an insertion depth of the prism of the laser oscillator, based on the low speed feedback signal.

17. The method of claim 16, wherein a carrier-envelope phase (CEP) offset frequency of the laser pulse generated by the laser oscillator is controlled by varying an output of the laser pulse generated by the mode locked pulsed laser, based on the high speed feedback signal, and wherein the carrier-envelope phase (CEP) offset frequency of the laser pulse generated by the laser oscillator is controlled by increasing the insertion depth of the prism of the laser oscillator, based on the low speed feedback signal.

18. The method of claim 16, wherein stabilizing the carrier-envelope phase (CEP) of the laser pulse generated by the mode locked pulsed laser, based on the high speed feedback signal and the low speed feedback signal, further comprises controlling the carrier-envelope phase (CEP) of the laser pulse generated by the mode locked pulsed laser to have substantially a constant value with respect to time based on the high speed feedback signal and the low speed feedback signal.

* * * * *

UNITED STATES PATENT AND TRADEMARK OFFICE
CERTIFICATE OF CORRECTION

PATENT NO. : 7,701,982 B2
APPLICATION NO. : 12/003294
DATED : April 20, 2010
INVENTOR(S) : Tae-Jun Yu et al.

Page 1 of 1

It is certified that error appears in the above-identified patent and that said Letters Patent is hereby corrected as shown below:

Title Page, Item (75) should read

--(75) Inventors: Tao-Jun Yu, Gwangju (KR); Jong-Min Lee, Gwangju (KR); Chang Hee Nam, Gwangju (KR); Do-Kyeong Ko, Gwangju (KR)--

Signed and Sealed this
Fourth Day of January, 2011

David J. Kappos
*Director of the United States Patent and Trademark Office*

UNITED STATES PATENT AND TRADEMARK OFFICE
CERTIFICATE OF CORRECTION

PATENT NO. : 7,701,982 B2  Page 1 of 1
APPLICATION NO. : 12/003294
DATED : April 20, 2010
INVENTOR(S) : Tae-Jun Yu et al.

It is certified that error appears in the above-identified patent and that said Letters Patent is hereby corrected as shown below:

Title Page, Item (75) should read

--(75) Inventors: Tae-Jun Yu, Gwangju (KR); Jong-Min Lee, Gwangju (KR); Chang Hee Nam, Gwangju (KR); Do-Kyeong Ko, Gwangju (KR)--

This certificate supersedes the Certificate of Correction issued January 4, 2011.

Signed and Sealed this
Fourteenth Day of August, 2012

David J. Kappos
*Director of the United States Patent and Trademark Office*